United States Patent Office 3,703,528
Patented Nov. 21, 1972

3,703,528
1,2-DIPHENYL-3,5-DIOXO-4-SUBSTITUTED PYRAZOLIDINES
Silvano Casadio and Gianfranco Pala, Milan, Italy, assignors to Istituto de Angeli S.p.A., Milan, Italy
No Drawing. Filed June 12, 1970, Ser. No. 45,891
Claims priority, application Great Britain, June 27, 1969, 32,698/69
Int. Cl. C07d 49/08
U.S. Cl. 260—310 B          2 Claims

ABSTRACT OF THE DISCLOSURE

1,2-diphenyl-3,5-dioxopyrazolidines having a 3-methyl-2-butenyl or 4-methyl-3-pentenyl group at the 4-position. These compounds have anti-inflammatory and analgesic activity of the order of phenylbutazone, but markedly less ulcerogenic activity.

---

This invention relates to novel 1,2-diphenyl-3,5-dioxo-4-substituted-pyrazolidines having valuable pharmacological properties.

British Pat. No. 646,597 describes compounds of the formula

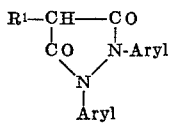

wherein $R^1$ is a hydrocarbon or substituted hydrocarbon structure with 2–10 carbon atoms bound to the pyrazolidine nucleus by a primary or secondary carbon atom, particularly a saturated or unsaturated aliphatic or cycloaliphatic or a phenyl-substituted aliphatic hydrocarbon or substituted hydrocarbon radical and aryl means a phenyl radical which may be either unsubstituted or substituted by halogen atoms, alkyl and/or alkoxy groups such alkyl and alkoxy groups containing from 1–3 carbon atoms. The compounds of the said British patent are described therein as having analgesic and/or anti-pyretic action.

Among the compounds described in the said British patent is the substance 1,2-diphenyl-3,5-dioxo-4-n-butyl-pyrazolidine, now known as phenylbutazone, which has been widely used, particularly in the treatment of rheumatic and arthritic conditions, by virtue of its anti-inflammatory analgesic and anti-pyretic properties. It may be noted that the abovementioned British patent makes no reference to the anti-inflammatory properties of phenylbutazone, these properties having been discovered at a subsequent date.

It is well-known that phenylbutazone, while widely used, possesses a marked ulcerogenic action, which may give rise to serious consequences.

We have studied the properties of a number of 1,2-diphenyl - 3,5-dioxo-4-substituted pyrazolidine compounds, related to phenylbutazone, in an attempt to find compounds which possess the desirable therapeutic properties, especially the anti-inflammatory action of phenylbutazone but with reduced ulcerogenic action. Thus for example we have studied 1,2-diphenyl-3,5-dioxo-4-(2'-butenyl)- and 1,2 - diphenyl-3,5-dioxo-4-allyl-pyrazolidines, described in the above-mentioned British patent, and have found the former of these two compounds has antiinflammatory action and an ulcerogenic action in each case comparable to the actions of phenylbutazone; the 4-allyl compound has an ulcerogenic action less than that of phenylbutazone but also a lower anti-inflammatory activity. It would seem, therefore, that there is a strict correlation between the desired pharmacological activity and the ulcerogenic side-effect, in the hitherto known straight-chain 4-alkyl and 4-alkenyl derivatives of 1,2-diphenyl-3,5-dioxopyrazolidine.

In pursuance of our researches we have now discovered that two new compounds hereinafter described possess both anti-inflammatory and analgesic activities at least as great as that of phenylbutazone, but markedly less ulcerogenic activity. Or two new compounds also have an appreciable anti-pyretic activity, although less than that of phenylbutazone. It is, however, well known that in the treatment of rheumatic and arthritic conditions anti-inflammatory and analgesic properties are of prime importance, anti-pyretic activity being useful, although of secondary importance. Thus our new compounds are highly effective drugs for use in the treatment of rheumatic, arthritic and other conditions for which phenylbutazone is used, and have the important advantage of a substantially lower ulcerogenic activity.

According to the present invention, we provide compounds of formula

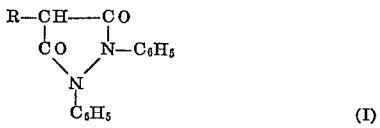

wherein R represents a 3-methyl-2-butenyl or 4-methyl-3-pentenyl group. The invention further includes salts of such compounds with physiologically acceptable cations e.g. the sodium, calcium, 2-hydroxy-ethylammonium, and tris-(2 - hydroxyethyl)-ammonium salts, and other salts analogous to salts of phenylbutazone.

The properties of the new compounds of this invention may be illustrated by the results of pharmacological experiments which we have carried out and which are set forth in the following table.

In these experiments the various substances were administered per os, the doses used in mg./kg. being shown in the table in parentheses after each result.

$$R-CH-CO$$
$$|\quad\quad\;|$$
$$CO\quad N-C_6H_5$$
$$\;\;\;\backslash N/$$
$$\quad|$$
$$\;\;C_6H_5$$

| R=:— | n-Butyl | 3-methyl-2-butenyl | 4-methyl-3-pentenyl |
|---|---|---|---|
| Anti-inflammatory activity in rats,* Carrageen induced oedema [1] | 100 (100) | 115 (100) | 134 (100) |
| Analgesic activity in rats,* mechanical stimulation of the paw [2] | 100 (100) | 119 (100) | 115 (100) |
| Antipyretic activity* | 100 (100) | 51.6 (100) | |
| Yeast induced fever [3] | 100 (300) | 49 (300) | 52 (300) |
| Ulcerogenic action in rats | 84 (100) | 33 (200) | 30 (200) |
| Ulcers frequency percent [4] | 95 (200) | 50 (400) | 50 (400) |

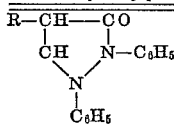

| R=:— | Allyl | 2-butenyl |
|---|---|---|
| Anti-inflammatory activity in rats,* Carrageen induced oedema [1] | 65 (100) | 94 (100) |
| Analgesic activity in rats,* mechanical stimulation of the paw [2] | 76.9 (100) | 76.4 (100) |
| Antipyretic activity* | 104.6 (100) | 60.8 (100) |
| Yeast induced fever [3] | | |
| Ulcerogenic action in rats | 60 (200) | 82 (200) |
| Ulcers frequency percent [4] | 100 (400) | 100 (400) |

[1,2,3] These experiments were performed substantially as described by: [1] C. A. Winter, International Symposium on non steroid anti-inflammatory drugs—September 1964—Excerpta Medica Foundation, Amsterdam, page 190; [2] L. O. Randall and J. J. Selitto, Arch. Int. Pharmacodyn., 111, 409 (1957); [3] C. Bianchi, B. Lumachi and L. Pegrassi, Arzn. Forsch., 17, 246 (1957), respectively.
[4] The ulcerogenic action was determined in male Sprague-Dawley rats (200–220 g. weight). The products were administered per os, in single doses, to animals which had been fasted for about 9 hours, the animals being kept fasting, except for water, for the whole duration of the experiment. After 15 hours from the administration, 2 ml./rat of a 1.5% (w./v.) solution of $FeCl_3$ were administered for a better evaluation of the lesions. After 1 hour, the animals were sacrificed; the stomachs were opened along the little curvature, were cautiously washed with water and dipped in a 2% solution of potassium ferricyanide acidified with 1% hydrochloric acid. After washing with water, the stomachs were examined macroscopically.

*The results are expressed on the basis of the activity of phenylbutazone being equal to 100.

The new compounds according to the invention may be prepared by any convenient process, the following being examples of processes which may be used.

In the following description and claims the expression "lower" as applied to alkyl and alkanoyl groups denotes such groups as contain from 1 to 6 and 2 to 6 carbon atoms respectively.

(1) Reaction of hydrazobenzene, or a reactive derivative thereof with a reactive derivative of malonic acid of formula:

(II)

(where R has the above-defined meaning and the groups X are groups which react with hydrazobenzene, or a reactive derivative thereof, to form a compound of Formula I, e.g. lower alkyl groups or halogen atoms), in the presence of a cyclising agent, under substantially anhydrous conditions. If desired, the reaction may be carried out in two steps by preparing a compound of formula:

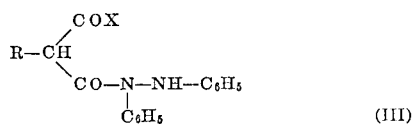
(III)

(where R and X are as above defined), for example by conventional methods, preferably a lower alkyl ester (X=O-alkyl) and cyclizing the compound of Formula III in the presence of a cyclising agent to produce a compound of Formula I.

In another modification of this reaction a compound of Formula III in which X is an O-lower alkyl group may be prepared in situ, by reacting a di-lower alkyl ester, of malonic acid and hydrazobenzene (or a reactive derivative thereof) with a halide of formula R—Hal (where R has the meaning defined above and Hal is a halogen atom) in the presence of a condensing agent. These reactions are discussed hereinbelow:

(a) A di-lower alkyl ester of Formula II (X=O-lower alkyl) preferably the diethyl ester may be reacted with hydrazobenzene or a lower alkanoyl ester thereof; e.g. N-acetylhydrazobenzene, in the presence of a basic condensing agent, advantageously sodium methylate, ethylate or butylate, or sodamide under substantially anhydrous conditions. The reaction is preferably carried out in the presence of an inert solvent, e.g. ethanol, butanol, toluene or xylene, at an elevated temperature, for example, the boiling point of the reaction mixture, the solvent being then distilled off to yield a solid mass. The reaction may also be carried out by slowly adding a basic condensing agent, for example of the above-stated type to a mixture of a di-lower alkyl ester, preferably the diethyl ester, of malonic acid, hydrazobenzene and an halide R—Hal (where R has the meaning defined above and Hal is a halogen atom, preferably a bromine atom), advantageously in the presence of inert solvents e.g. of the above-mentioned type. During the addition of the condensing agent the temperature of the reaction mixture is slowly increased up to the boiling point and boiling conveniently under reflux, continued for about one hour. The solvent may then be gently distilled off until a solid mass is obtained.

(b) Halides of Formula II (X=halogen), preferably chlorides, may be reacted with hydrazobenzene in the presence of an acid binding agent, preferably tertiary amines e.g. pyridine, quinoline, or dimethylaniline, conveniently in the presence of an inert solvent such as ether or chloroform. If desired an excess of tertiary amine may serve as solvent. This reaction may for example be carried out at a temperature of from 0–50° C.

(c) In a variation of the reactions described under (a) and (b) above, a compound of Formula III, in which X is a lower alkoxy group or a halogen atom, respectively, may be used as starting material in place of the compound of Formula II in the presence of a condensing agent or an acid binding agent respectively.

(2) Reaction of 1,2-diphenyl-3,5-dioxo-pyrazolidine in the presence of an acid binding agent, or of an alkali metal salt of the said pyrazolidine, with a halide of formula R–Hal (wherein R is as above defined and Hal is a halogen atom) to obtain a compound of Formula I. The reaction is preferably carried out by starting from an alkali metal salt, advantageously the sodium salt, of 1,2-diphenyl-3,5-dioxopyrazolidine, preferably suspended in an inert solvent, e.g. carbon tetrachloride, benzene or dimethylsulphoxide, and by slowly adding to the suspension the halide R—Hal, preferably the bromide, conveniently at room temperature or above. The reaction may be completed by heating under reflux. The resultant crude compound of Formula I may be purified by crystallization from ether or ethanol, preferably from ether, or by chromatography.

(3) Dehydration of a compound of formula:

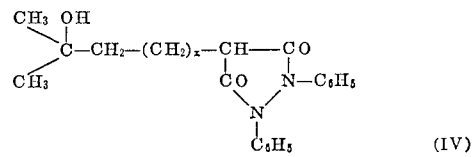
(IV)

in which $x$ is 1 or 2—with a dehydrating agent to give a compound of Formula I.

The reaction is carried out under anhydrous conditions, using, for example, phosphorus oxychloride, phosphorus oxybromide or boron trifluoride (preferably phosphorus oxychloride) as dehydrating agent in the presence of an acid binding agent, conveniently a tertiary amine, e.g. pyridine or quinoline. This reaction may for example be effected at temperatures of from 0–40° C. The crude compound so obtained may be purified by crystallization for example from ethanol or ether. Compounds of Formula IV may be obtained by conventional methods, for example of a Grignard reaction of the corresponding ketone with methylmagnesium bromide or iodide; the ketone may be obtained by hydrolysis of the corresponding ketal which in turn may be obtained from the corresponding malonic ester and hydrazobenzene, in the presence of a basic condensing agent.

(4) Reaction, under substantially anhydrous conditions, of a compound of formula:

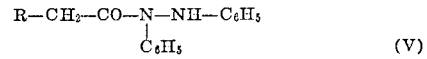
(V)

(where R has the meaning defined above) with a reactive derivative of carbonic acid e.g. a lower alkyl chlorocarbonate or carbonate in the presence of a basic condensing agent.

The compound of Formula V may be obtained by conventional methods, for example from the chloride of the corresponding acid and hydrabenzene.

If desired the reaction may be carried out, in a single step, by starting from a mixture of a lower alkyl ester of formula $$R—CH_2—COOAlk \quad (VI)$$

(where R is as above defined and Alk is a lower alkyl group), hydrazobenzene and a reactive derivative of carbonic acid in the presence of a basic condensing agent.

These reactions are discussed below:

(a) Reaction, under substantially anhydrous conditions, of a compound of Formula V with a lower alkyl chlorocarbonate, advantageously ethyl chlorocarbonate, in the presence of a basic condensing agent advantageously sodium hydride, or powdered sodium. The reaction is preferably carried out by heating the compound of Formula V with an excess of ethyl chlorocarbonate, at the boiling point of the reaction mixture, for example for 1–5 hours. The excess of ethyl chlorocarbonate may then be distilled off and the residue dissolved in a solvent, for example in benzene, heated in the presence of the basic condensing agent to complete the reaction for example under reflux for 8–16 hours, in the presence of a 50% suspension of sodium hydride in mineral oil.

(b) Reaction, under substantially anhydrous conditions, of a compound of Formula V with an excess of a di-lower alkyl carbonate, advantageously diethyl carbonate, in the presence of a condensing agent such as sodium amide, sodium hydride or powdered sodium metal. The reaction mixture is heated for example under reflux for 12–24 hours.

(c) Reaction, under substantially anhydrous conditions, of a mixture of a compound of Formula VI, advantageously the ethyl ester, hydrazobenzene, a di-lower alkyl carbonate, e.g. diethyl carbonate and a condensing agent, for example sodium hydride or powdered sodium metal. The reaction is preferably carried out by adding a mixture of a compound of Formula VI and the di-lower alkyl carbonate to a mixture (maintained at 50–100° C.) of hydrazobenzene and a 50% suspension of sodium hydride in mineral oil, in the presence of an inert solvent, preferably toluene or xylene, the reaction being completed by heating the reaction mixture conveniently under reflux, for 6–18 hours.

The compounds of Formula I obtained as above described are conveniently isolated from the reaction medium as aqueous solutions of the corresponding alkali metal (e.g. sodium) salt, the solution being then acidified, for instance with hydrochloric acid and the compound of Formula I so otained then purified by crystallizing from a suitable solvent, for example ethanol, ether, hexane or cyclohexane, or by chromatography.

In pure form the new compounds according to the invention are generally white crystalline solids, insoluble in water, soluble in aqueous solutions of alkalies (with formation of the corresponding salts), soluble in ethanol, methanol, benzene, and ether.

Salts of compounds of Formula I may be obtained by neutralization with an equivalent of corresponding base in conventional manner. For example the alkali metal salts of the compound of Formula I may be obtained by treatment with an alkali metal in water or aqueous alcohol or with an alkali metal alcoholate in alcohol. The alkali metal salts of compounds of Formula I are soluble in water. The alkaline earth salts, e.g. the calcium salts are generally insoluble in water, and may for example be obtained by a double decomposition reaction between an aqueous solution of a soluble salt, preferably the sodium salt, of a compound of Formula I and a water-soluble alkaline earth metal salt. Examples of salts of the compounds of Formula I according to the invention are the sodium, calcium, ethanolamine and triethanolamine salts.

According to a further feature of the present invention, we provide pharmaceutical compositions comprising, as active ingredient, at least one compound of Formula I, or at least one salt thereof, together with at least one pharmaceutical carrier or excipient, and if desired containing at least one further therapeutically active substance.

The pharmaceutical compositions according to the invention may be formulated by methods conventional in the pharmaceutical art. For internal administration dosage unit forms are generally preferred, each such dosage unit containing from 20–1000 mg., preferably 50–500 mg., of active ingredient.

For oral administration the compounds of Formula I may advantageously be formulated in tablets, coated tablets or capsules.

For rectal administration the compounds are preferably formulated in suppositories with conventional excipients, for instance, cocoa butter, glycerides of fatty acids and/or polyoxyethyleneglycols.

For parenteral administration, soluble salts of compounds of Formula I are preferably used, preferred forms being ampoules or vials containing a lyophilized mass of the salt.

For topical application the compounds of the invention may be formulated for example as ointments, creams, or dermatological solutions, the compounds of Formula I being used at the concentration of 1–10%, preferably 5%, by weight.

The daily dosage, in the adult of the compounds according to the invention will generally vary from 50 to 1000 mg. per day for internal administration, dependent upon the nature of the condition being treated. For topical application the topical preparation may be applied to the affected area several times daily as may be necessary.

The following examples illustrate the invention:

Example 1

43.8 g. (0.237 mole) of hydrazobenzene are added to a solution of sodium ethylate obtained by dissolving 6.55 g. (0.285 mole) of sodium in 125 ml. of anhydrous ethanol. 59.6 g. (0.2612 mole) of diethyl 3-methyl-2-butenyl-malonate are then added, with stirring, at the reflux temperature.

The reaction mixture is refluxed for 1 hour, then the solvent is slowly distilled off, the distillation being completed in vacuo. The solid residue so obtained is dissolved in 400 ml. of water and washed with ether. The solution is acidified with 10% HCl and the 1,2-diphenyl-3,5-dioxo-4-(3'-methyl-2'-butenyl)-pyrazolidine which separates, purified by crystallization from ethanol (M.P. 155–156° C.).

Analysis.—Found for $C_{20}H_{20}N_2O_2$ (percent): C, 75.04; H, 6.32; N, 8.65. Calcd. (percent): C, 74.97; H, 6.29; N, 8.74.

By proceeding in an analogous manner and starting from diethyl 4-methyl-3-pentenyl-malonate, 1,2-diphenyl-3,5-dioxo-4-(4'-methyl - 3' - pentenyl)pyrazolidine is obtained. (M.P. 136–137° C.).

Analysis.—Found for $C_{21}H_{22}N_2O_2$ (percent): C, 75.72; H, 6.65; N, 8.48. Calcd. (percent): C, 75.42; H, 6.63; N, 8.38.

Example 2

4.1 g. (0.019 mole) of 3-methyl-2-butenyl-malonyl chloride are added to a solution of 3.41 g. (0.043 mole) of pyridine in 34 ml. of chloroform, the temperature being maintained at 0–5° C. 3.61 g. (0.019 mole) of hydrazobenzene dissolved in 19 ml. of chloroform are then added. The reaction mixture is stirred at room temperature for 12 hours, then diluted with ether, washed with water, then with 10% hydrochloric acid and finally with water until the wash waters are neutral to phenolphthalein. The organic layer is dried over sodium sulphate and evaporated to dryness; the residual 1,2-diphenyl-3,5-dioxo-4-(3'-methyl-2'-butenyl)-pyrazolidine, is crystallized from ethanol (M.P. 155–156° C.).

Example 3

14.5 g. (0.097 mole) of 1-bromo-3-methyl-2-butene are dropped into a suspension of 19 g. (0.069 mole) of the sodium salt of 1,2-diphenyl-3,5-dioxopyrazolidine in 120 ml. of carbon tetrachloride.

The reaction mixture is stirred at room temperature for 1 hour then refluxed for 4 hours. The precipitated solid is filtered off and the filtrate evaporated to dryness. The residue is thoroughly washed with ether and redissolved in aqueous sodium hydroxide.

After washing with ether the alkaline solution is acidified with 10% hydrochloric acid and the 1,2-diphenyl-3,5-dioxo-4-(3'-methyl-2'-butenyl) - pyrazolidine which separates, is crystallized from ether (M.P. 155–156° C.).

Example 4

3.87 g. (0.0237 mole) 1-bromo-4-methyl-3-pentene are dropped, with stirring, into a solution of 5 g. (0.0182 mole) of the sodium salt of 1,2-diphenyl-3,5-dioxopyrazolidine in 40 ml. dimethylsulphoxide, the temperature being maintained at 50–60° C.

The reaction mixture is then stirred at 60° C. for 6 hours; the solvent is distilled off under vacuum and the residue is treated simultaneously with 100 ml. ether and 10 ml. 10% hydrochloric acid.

The ethereal layer is separated off, washed with water, dried over magnesium sulphate, and evaporated.

The tarry product so obtained is purified by chromatography on silica gel (solvent: benzene, 9:1 benzene-ethyl acetate mixture).

The fraction obtained is evaporated to dryness and the residue is triturated with ether; 1,2-diphenyl-3,5-dioxo-4-(4'-methyl-3'-pentenyl)-pyrazolidine is obtained, M.P. 136–137° C.

Example 5

(a) A solution of 0.4 mole of methylmagnesium iodide in 200 ml. of anhydrous ether is dropped into a solution of 25.8 g. (0.080 mole) of 1,2-diphenyl-3,5-dioxo-4-(3'-oxo-butyl)-pyrazolidine in 400 ml. of anhydrous benzene, the temperature being maintained at 0–10° C.

The reaction mixture is stirred at room temperature for 16 hours and then decomposed, with external cooling, by cautious addition of a saturated solution of ammonium chloride.

The aqueous layer is washed with ether and acidified with 10% hydrochloric acid.

1,2-diphenyl-3,5-dioxo-4-(3'-methyl-3'-hydroxy-butyl)-pyrazolidine separates as a tarry solid which solidifies (M.P. 145–146° C.).

(b) 10.15 g. (0.030 mole of 1,2-diphenyl-3,5-dioxo-4-(3'-methyl-3'-hydroxy-butyl)-pyrazolidine dissolved in 50 ml. of pyridine, are added dropwise to a solution of 7.2 g. (0.047 mole) of $POCl_3$ in 13.8 ml. of pyridine, the temperature being maintained at 0–5° C. The reaction is stirred at room temperature for 24 hours and then poured into 40 ml. of water. The solution is adjusted to pH 5.4 with 15% hydrochloric acid. A tarry solid separates which is collected and crystallized from ethanol to yield 1,2-diphenyl-3,5-dioxo-4-(3'-methyl-2'-butenyl) - pyrazolidine (M.P. 155–156° C.). By proceeding in analogous manner but starting from 1,2-diphenyl-3,5-dioxo-4-(4'-methyl-4'-hydroxy-pentyl)-pyrazolidine, 1,2-diphenyl-3,5-dioxo-4-(4'-methyl-3'-pentenyl)pyrazolidine is obtained.

Example 6

9.2 g. (0.063 mole) of a solution of 5-methyl-4-hexenoyl chloride in 10 ml. of benzene are added, with stirring, to a mixture of 10.55 g. (0.057 mole) of hydrazobenzene, 50 ml. of benzene, 2.47 g. (0.068 mole) of sodium hydroxide and 20 ml. of water, the temperature being maintained at about 10° C. The yellow dense suspension obtained is stirred at room temperature for 45 minutes and then filtered. The solid obtained is washed with benzene and crystallized from methanol to yield 5-methyl-4-hexenoyl-N,N'-diphenylhydrazine.

5 g. (0.017 mole) of 5-methyl-4-hexenoyl-N,N'-diphenylhydrazine and 9.22 g. (0.085 mole) of ethyl chlorocarbonate are refluxed for 5 hours, and the excess of ethyl chlorocarbonate then distilled off. The oily residue so obtained is dissolved in 50 ml. of anhydrous benzene and refluxed for 12 hours in the presence of 1.23 g. (0.025 mole) of a 50% suspension of sodium hydride in mineral oil. The reaction mixture is then decomposed by cautious addition of water with external cooling.

The aqueous solution is washed with ether and acidified with 10% hydrochloric acid and the 1,2-diphenyl-3,5-dioxo-4(3'-methyl-2'-butenyl)-pyrazolidine that separates is crystallized from ethanol (M.P. 155–156° C.).

Example 7

2 g. (0.0068 mole) of 5-methyl-4-hexenoyl-N,N'-diphenylhydrazine and 1.21 g. (0.0102 mole) of diethyl carbonate in 30 ml. of benzene are refluxed for 18 hours in the presence of 0.4 g. (0.0102 mole) of sodamide. After cooling the reaction mixture is decomposed by cautious addition of water, and the aqueous layer is washed with ether and acidified with 10% hydrochloric acid. The 1,2-diphenyl-3,5-dioxo-4-(3'-methyl - 2' - butenyl)-pyrozolidine which separates out is then purified by crystallization from ethanol (M.P. 155–156° C.).

Example 8

A mixture of 7.19 g. (0.046 mole) of ethyl 5-methyl-4-hexenoate and 5.76 g. (0.048 mole) of diethyl carbonate is added to a mixture of 7.36 g. (0.040 mole) of hydrazobenzene, 8 g. (0.167 mole) of a 50% suspension of sodium hydride in mineral oil and 120 ml. of anhydrous xylene, heated to 75° C. The reaction mixture is then refluxed for 12 hours and after cooling, is cautiously treated with water. The aqueous layer is washed with ether and acidified with 10% hydrochloric acid.

The 1,2 - diphenyl-3,5-dioxo-4-(3'-methyl-2'-butenyl)-pyrazolidine which separates out is then crystallized from ethanol. (M.P. 155–156° C.). By proceeding in analogous manner but starting from ethyl 6-methyl-5-heptenoate, 1,2-diphenyl-3,5-dioxo-4-(4'-methyl - 3' - pentenyl)-pyrazolidine is obtained.

Example 9

12.5 g. (0.039 mole) of 1,2-diphenyl-3,5-dioxo-4-(3'-methyl-2'-butenyl)-pyrazolidine are dissolved by heating in a solution of sodium ethylate, obtained from 0.89 g. (0.039 mole) of sodium and 90 ml. of anhydrous ethanol. The solvent is distilled off under reduced pressure and the sodium salt of 1,2-diphenyl-3,5-dioxo-4-(3'-methyl-2'-butenyl)-pyrazolidine is obtained as an ivory-white solid.

Example 10

10 g. of the sodium salt of 1,2-diphenyl-3,5-dioxo-4-(3'-methyl-2'-butenyl)-pyrazolidine dissolved in 150 ml. of water are treated with stirring with a saturated aqueous solution of calcium chloride until no more precipitate is formed. The precipitated calcium salt is filtered, washed with water and dried under reduced pressure.

The following examples illustrate pharmaceutical compositions according to the invention:

EXAMPLE 11

| Tablets | Milligrams | | |
|---|---|---|---|
| | A | B | C |
| 1,2-diphenyl-3,5-dioxo-4-(3'-methyl-2'-butenyl)-pyrazolidine | 200 | 300 | 400 |
| Microcrystalline cellulose | 50 | 50 | 50 |
| Corn starch | 77 | 115 | 115 |
| Talc and magnesium stearate | 3 | 5 | 5 |

EXAMPLE 12

| Hard gelatine capsules | Milligrams | | |
|---|---|---|---|
| | A | B | C |
| Each capsule contains: | | | |
| 1,2-diphenyl-3,5-dioxo-4-(3'-methyl-2'-butenyl)-pyrazolidine | 200 | 300 | 400 |
| Talc | 5 | 5 | 5 |

EXAMPLE 13

| Coated tables | Milligrams | | |
|---|---|---|---|
| | A | B | C |
| Core: | | | |
| 1,2-diphenyl-3,5-dioxo-4-(3'-methyl-2'-butenyl)-pyrazolidine | 200 | 300 | 400 |
| Microcrystalline cellulose, corn starch, talc, and magnesium stearate | 130 | 170 | 210 |
| Coating: Sugar, gum arabic, coloring agent and titanium dioxide. | | | |
| Final weight | 550 | 700 | 850 |

Example 14

Dermatological solution:                                  G.
    1,2-diphenyl - 3,5 - dioxo - 4 - (3'-methyl-2'-butenyl)-pyrazolidine _____ 5
    Dimethylsulphoxide _____ 85
    Distilled water _____ 10

Example 15

Ointment:

| | G. |
|---|---|
| 1,2-diphenyl - 3,5 - dioxo - 4 - (3'-methyl-2'-butenyl)-pyrazolidine | 5 |
| Methyl parahydroxybenzoate | 0.1 |
| Propyl parahydroxybenzoate | 0.02 |
| Lanolin | 5.88 |
| White vaseline | 89 |

Example 16

Creams:

| | G. |
|---|---|
| 1,2 - diphenyl-3,5-dioxo-4-(3'-methyl-2'-butenyl)-pyrazolidine | 5 |
| Cetyl alcohol | 7.5 |
| Glyceryl monostearate | 3.75 |
| Lanolin | 2.30 |
| White vaseline | 27.00 |
| Methyl parahydroxybenzoate | 0.09 |
| Propyl parahydroxybenzoate | 0.050 |
| Distilled water, q.s. to | 100 |

EXAMPLE 17

| Suppositories | A | B |
|---|---|---|
| 1,2-diphenyl-3,5-dioxo-4-(3'-methyl-2'-butenyl)-pyrazolidine, mg | 300 | 400 |
| Glycerides of fatty acids, q.s. | | |
| Suppository weight, g | 2 | 2 |

Example 18

Vials containing a lyophilized mass:

| | |
|---|---|
| 1,2-diphenyl-3,5-dioxo-4-(3'-methyl-2'-butenyl)-pyrazolidine sodium salt ____mg__ | 250 |
| Sodium glycollate ____mg__ | 250 |
| Distilled water, q.s.[1] | |

Solvent vials:

| | |
|---|---|
| Bidistilled water ____ml__ | 5 |

[1] For a solution to be lyophilized to obtain a solid mass.

We claim:
1. 1,2-diphenyl-3,5-dioxo - 4 - (3'-methyl-2'-butenyl)-pyrazolidine or a physiologically acceptable salt thereof.
2. 1,2-diphenyl-3,5-dioxo - 4 - (4'-methyl-3'-pentenyl)-pyrazolidine or a physiologically acceptable salt thereof.

References Cited
UNITED STATES PATENTS 2,562,830　7/1951　Stenzl ____ 260—310 B

FOREIGN PATENTS

| 217,274 | 9/1958 | Australia | 260—310 B |
| 956,850 | 4/1964 | Great Britain | 260—310 B |
| 269,984 | 11/1950 | Switzerland | 260—310 B |

NATALIE TROUSOF, Primary Examiner

U.S. Cl. X.R.

260—544 M, 562 H; 424—273